W. JAMESON.
FEEDING MECHANISM FOR MIXING MILLS.
APPLICATION FILED MAY 10, 1917.
1,302,053.
Patented Apr. 29, 1919.
2 SHEETS—SHEET 1.
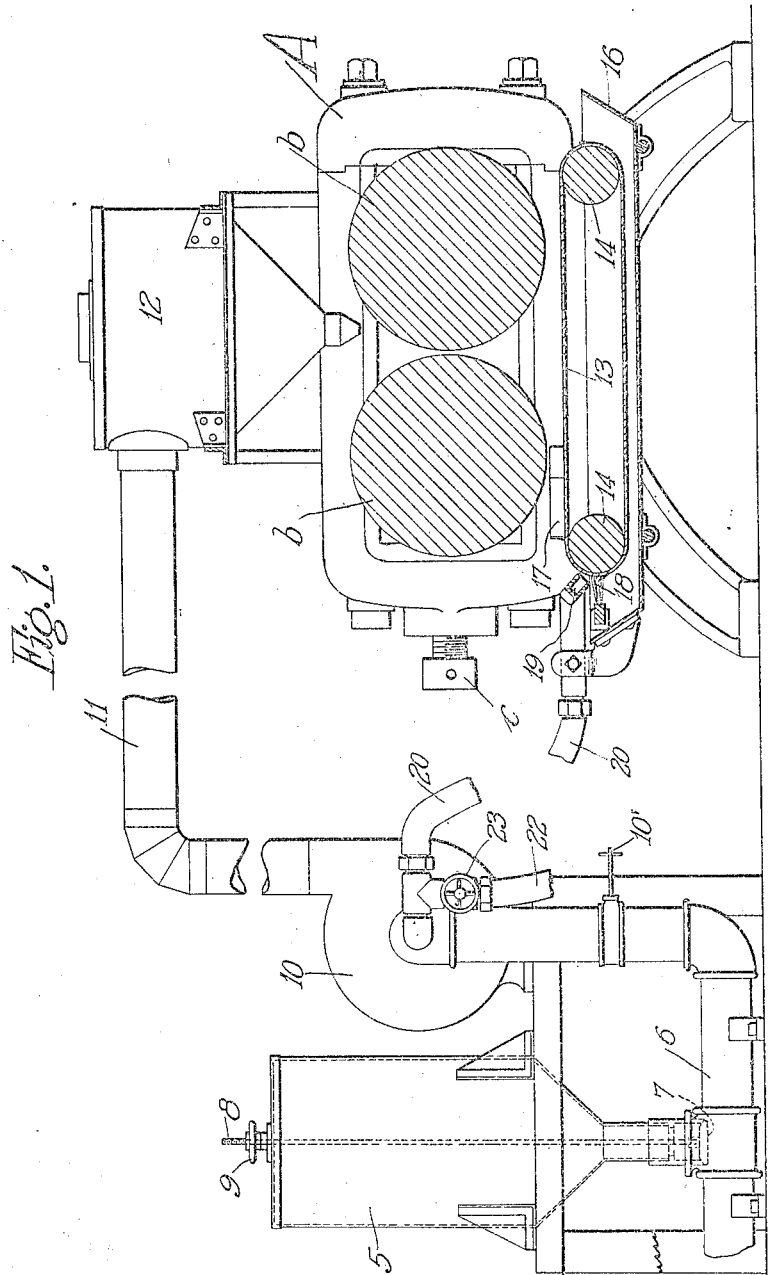
WITNESSES:
W. C. Ross
INVENTOR.
William Jameson.
BY Chapin + Neal
ATTORNEYS.

W. JAMESON.
FEEDING MECHANISM FOR MIXING MILLS.
APPLICATION FILED MAY 10, 1917.
1,302,053.
Patented Apr. 29, 1919.
2 SHEETS—SHEET 2.
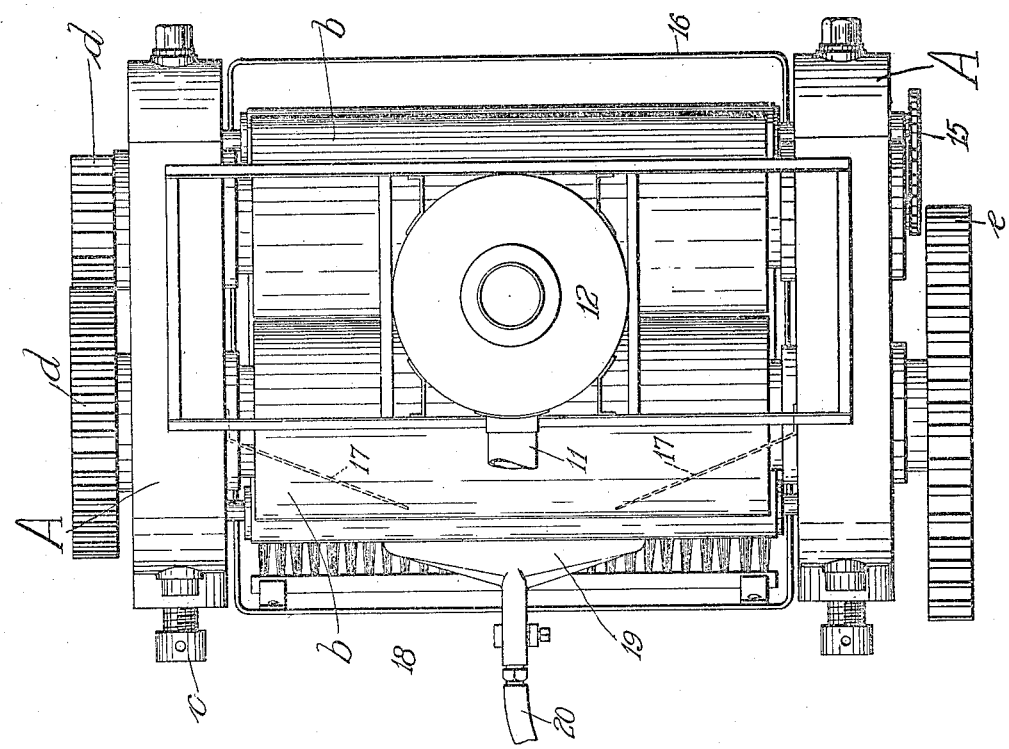
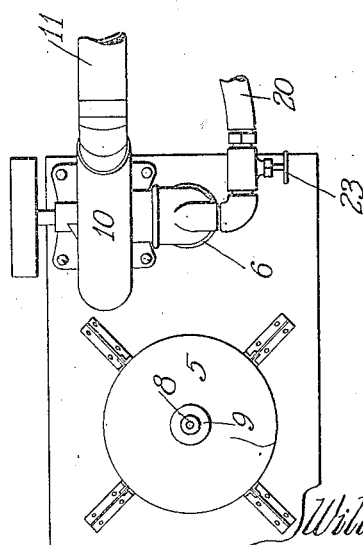
WITNESSES:
W. C. Ross
INVENTOR.
William Jameson.
BY
Chapin + Neal
ATTORNEYS.

UNITED STATES PATENT OFFICE.

WILLIAM JAMESON, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

FEEDING MECHANISM FOR MIXING-MILLS.

1,302,053.          Specification of Letters Patent.      Patented Apr. 29, 1919.

Application filed May 10, 1917. Serial No. 167,676.

*To all whom it may concern:*

Be it known that I, WILLIAM JAMESON, a citizen of the United States of America, residing at Chicopee Falls, in the county of Hampden and State of Massachusetts, have invented certain new and useful Improvements in Feeding Mechanism for Mixing-Mills, of which the following is a specification.

This invention relates to improved feeding mechanism for mixing mills and, while the invention is capable of general application, it finds one advantageous specific use in rubber manufacture. For example, the invention may be utilized to supply charges of chemicals of various sorts, usually in powder form, to the mixing mill to be worked into the rubber and to collect and return any surplus material not worked into the rubber by the mill to the latter until all of the charge has been worked into the rubber.

The invention has for its object to provide means for feeding material to a mixing mill and improved means to collect and return to the mill any surplus material passing therethrough as will be more particularly pointed out in the appended claims.

The invention in an embodiment at present preferred is shown for illustrative purposes in the accompanying drawings, in which—

Figure 1 is a sectional view of a mixing machine showing the invention as applied thereto; and Fig. 2 is a plan view thereof.

Referring to these drawings in detail, A represents the frame of the mixing machine in which a pair of rolls $b$ are journaled. The distance between the rolls may be varied as desired by screws $c$, the rolls being mounted in slidable bearings (not shown) in the usual and well known manner. Rolls $b$ are connected by intermeshing gears $d$ so that one drives the other and ordinarily one roll, that to the left, is driven at a slower speed than the other.

The structure thus far described is well known in the art as a reducing mill or mixer for rubber and the like. Crude rubber is thrown into the bight of the revolving rolls $b$ and is worked into a sheet which generally clings to and travels around the slow traveling roll $b$. After the rubber has been worked into sheet form, certain chemicals, usually in powder form, such as coloring matter, for example, are introduced into the bight of rolls $b$ and mixed with and thoroughly worked into the rubber. This invention is more particularly concerned with mechanism to feed such chemicals to the mixing mill and with means to collect and return to the mill such surplus powder as falls from the rolls $b$ during the mixing operation.

The chemicals are contained in a closed storage hopper 5 which may be arranged in a convenient location at a distance from the mixing mill. Hopper 5 is arranged for gravity discharge into a pipe line 6, and the rate of discharge may be regulated by a valve 7 in the hopper, the stem 8 of the valve extending upwardly through the hopper and its cover and having a hand nut 9 threaded thereon, whereby the valve may be lifted or lowered in an obvious manner. The pipe line 6, to which other hoppers containing other chemicals may be connected, if desired, in the manner described, terminates at and is connected with a suitable fan, indicated in conventional form at 10. A suitable gate valve 10′ is provided in pipe 6 between hopper 5 and fan 10. The outlet of the latter is connected by a pipe line 11 to a hopper 12 which is suitably mounted from frame A above the rolls $b$ and is preferably mounted so that its discharge falls on only one of the traveling rolls $b$, as shown in Fig. 1.

The fan 10 draws such chemicals as are deposited in pipe 6 by container 5, or any other container which may be connected to pipe 6, through the latter and forces the chemicals into hopper 12. The latter or hopper referred to is preferably a cyclone separator of well known construction in which the air is discharged at the top and the material at the bottom. The chemicals fall from the latter directly upon the rubber and are gradually mixed therewith and worked therein. In thus mixing the chemicals with the rubber, there is a tendency for some of the former to fall between the rolls and to drop from the rubber during its travel around the lower periphery of roll $b$.

In order to collect such surplus powder as falls below rolls $b$, an endless belt 13 is provided which is mounted on suitable rolls 14 so that the upper travel of the belt is substantially horizontal and preferably at such a distance below rolls $b$ that the belt does not engage the rolls or the rubber thereon. One roll 14 may be driven by a chain 15 and suitable sprockets from one roll $b$, as shown in Figs. 1 and 2. Below the conveyer 13 is a trough 16 to collect what small amounts of powder fall from the conveyer. The belt conveyer carries the surplus powder to the left, as viewed in Fig. 1, and, as conveyer 13 travels to the left, the powder is plowed or scraped toward the center of the conveyer by two oppositely arranged bars 17 which are suitably fixed to frame A and extend inwardly toward one another with a forward inclination in the direction of travel of the conveyer.

Fixed to the left hand end of trough 16 is a brush 18, the bristles of which extend horizontally toward and bear against the conveyer 13 as it travels around left hand roll 14. Brush 18 holds back the powder from the conveyer and prevents any appreciable amount from falling into trough 16. Just above the brush 18 is a nozzle 19 which terminates closely adjacent the conveyer 13. Nozzle 19 preferably is only slightly longer than the distance between the free ends of the described scraper arms 17, although obviously it may extend entirely across the conveyer, if desired, in which case the arms 17 would not be required. Nozzle 19 is connected by suitable means, such as a flexible hose 20, for example, to the described pipe 6. The suction from fan 10 will draw the powder collected by conveyer 13 back to the upper part of pipe 6. If gate 10' is closed, the strong suction through hose 20 will draw the powder to be again delivered to the hopper 12. The brush 18, aside from its described function, also acts to loosen any powder clinging to the conveyer belt 13, so that it may be readily withdrawn by the nozzle 19.

Preferably another flexible hose 22, having a valve 23 therein, is connected to the fan 10. Hose 22 with suitable terminal tools is used, when desired, to remove such powder as lodges in trough 16 and may be otherwise used to clean the machine and so forth.

In operation, a batch of crude rubber is thrown into rolls $b$ and reduced to sheet form as described. A measured charge of chemicals is then introduced into hopper 12, by means of fan 10, the valve 10' being opened. As soon as the hopper has been filled to the desired degree, valve 10' is closed, and the rolls $b$ work the powder discharged from hopper 12 into the rubber. The rolls $b$ are rotated while the measured charge from hopper 12 is discharged and whatever powder falls from the rolls or the film of rubber is returned by conveyer 13 and nozzle 19 to the fan 10 and thence to the hopper 12, so that none of the charge is wasted. Thus, the conveyer 13 furnishes a convenient indication of the completion of the mixing of the powder with the rubber, for, when the conveyer is free from powder, it is apparent that all the charge in hopper 12 has been worked into the rubber.

It is important to note that charges of various kinds of powders may be introduced into hopper 12 when several containers 5 are connected to pipe 6. All but one of the series of containers may be closed off by valves 7 or two or more may be opened in a regulable manner at the same time to obtain a mixed charge of two or more kinds of chemicals.

The mechanism described permits powder to be carried in an improved manner in continuous cycles of operation through the mixing mill until all the powder has been worked into the rubber, and it is characterized by effecting this result without unduly scattering the powder about the machine. The suction nozzle 19 creates a draft which acts to prevent the powder from scattering in small clouds into the surrounding air. Aside from the desirable features of cleanliness in operation, the arrangement is of importance in safeguarding the health of the operatives. Mixing mills have heretofore been constructed in which a belt conveyer, as 13, not only travels under the bight of the rolls but part way around and against one of the rolls. The powder is thus returned and pressed by the belt against the rubber. This prior construction is characterized by means for guiding the conveyer and placing it into and away from position against the mixing roll. Thus, in order to expose the roll against which the conveyer belt is pressed, the latter must be swung out of the way. The mechanism and labor necessary for such an operation are objectionable. By means of the present invention, such mechanism and labor are rendered unnecessary.

Thus, the invention provides an improved feeding apparatus for passing materials, such as powder and the like, in a circuit through a mixing mill. The invention has been described herein for the purpose of illustration, but the scope of the invention is defined by the appended claims rather than by the foregoing description.

What I claim is—

1. The combination with the rolls of a mixing mill, of a hopper to feed material thereto, a storage container for said material at a distance from the hopper, pneumatic means to convey the material, which passes through the rolls and is unmixed thereby, back to the hopper to be subsequently fed to the rolls, and means to connect said container to said pneumatic means when desired, whereby a charge of material may be delivered from the container to the hopper.

2. The combination with the rolls of a mixing mill, of a hopper to feed material thereto, a pipe line to which storage containers of the material may be connected, automatic means to convey a charge of material through the pipe line to the hopper, a valve to close the pipe line after the desired charge has been fed to the hopper, and means coöperating with said automatic means to convey the material back to said hopper to be subsequently fed to the rolls, all constructed and arranged so that the material is carried in a definite path successively through the rolls until all of the charge has been mixed with other material by said rolls.

3. The combination with the mixing rolls of a mixing mill, of a hopper to feed material to said rolls to be mixed with other substances separately fed to the rolls, means movable below the rolls to collect the material which passes through the rolls unmixed with said substances, and pneumatic means to convey the collected unmixed material back to the hopper to be subsequently fed to the rolls.

4. The combination with the mixing rolls of a mixing mill, of a hopper to feed material to said rolls to be mixed with other substances separately fed to the rolls, a conveyer below the rolls to receive such material as passes through the rolls unmixed with said substances, a nozzle adjacent the conveyer, connections between the nozzle and the hopper, and means to remove the material from the conveyer by suction through said nozzle and force it back to the hopper to be subsequently fed to the rolls.

5. The combination with the mixing rolls of a mixing mill, of a hopper to feed material to said rolls to be mixed with other substances separately fed to the rolls, a conveyer mounted to travel below said rolls and upon which material unmixed by the rolls with said substances may fall, a brush engageable with the conveyer, a nozzle adjacent the conveyer and brush, plows to divert the material on the conveyer into the path of the nozzle, and pneumatic means connected with the latter and said hopper to remove the material from the conveyer and return it to said hopper.

6. The combination with the rolls of a mixing mill, of a hopper to feed powders and the like thereto to be mixed with other substances separately fed to the rolls, a conveyer mounted to travel below the rolls to receive such powders as are unmixed with the substances by the rolls, and pneumatic means to remove the unmixed powder from the conveyer and return it to said hopper to be subsequently fed to the rolls, said last-named means being constructed and arranged to create a draft between and below the rolls to prevent scattering of the powder and diffusion of the latter into the surrounding air.

7. The combination with mixing rolls, of a hopper arranged to discharge into the bight of the rolls, a conveyer arranged to receive material from between the rolls and pneumatic means associated with the hopper and conveyer to cause the material not held on the rolls to pass through a complete cycle from and to the bight of the rolls.

8. The combination with mixing rolls, of a hopper arranged to discharge into the bight of the rolls, a belt conveyer arranged to travel under the rolls, means to hold material at a given point on the belt against travel therewith, and pneumatic means to convey such material to the hopper.

WILLIAM JAMESON.

Copies of this patent may be obtained for five cents each, by addressing the "Commissioner of Patents, Washington, D. C."